United States Patent
Kim et al.

(10) Patent No.: US 9,078,202 B2
(45) Date of Patent: Jul. 7, 2015

(54) APPARATUS AND METHOD FOR ACTIVELY DETERMINING COMMUNICATION LINK IN COMMUNICATION SYSTEM

(71) Applicant: Samsung Electronics Co., Ltd., Suwon-si, Gyeonggi-do (KR)

(72) Inventors: Jin-Seong Kim, Incheon (KR); Ki-Hyuk Kum, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 168 days.

(21) Appl. No.: 13/774,392

(22) Filed: Feb. 22, 2013

(65) Prior Publication Data
US 2013/0223425 A1    Aug. 29, 2013

(30) Foreign Application Priority Data
Feb. 24, 2012    (KR) .................. 10-2012-0018909

(51) Int. Cl.
*H04W 48/20*    (2009.01)
(52) U.S. Cl.
CPC .................. *H04W 48/20* (2013.01)

(58) Field of Classification Search
CPC .............................. H04W 48/20; H04W 48/08
USPC ........................................................ 370/338
See application file for complete search history.

(56) References Cited

U.S. PATENT DOCUMENTS

| 2005/0119006 A1 | 6/2005 | Cave et al. |
| 2005/0141468 A1 | 6/2005 | Kim et al. |
| 2010/0302957 A1 * | 12/2010 | Ketheesan et al. ............ 370/252 |

FOREIGN PATENT DOCUMENTS

| KR | 10-2010-0067893 A | 6/2010 |
| KR | 10-2010-0130535 A | 12/2010 |

* cited by examiner

*Primary Examiner* — Melvin Marcelo
(74) *Attorney, Agent, or Firm* — Jefferson IP Law, LLP

(57) ABSTRACT

An apparatus and a method for determining a communication link in a client node of a communication system are provided. In the method, access network information and channel state information for at least one host node are determined. Link state information for each host node is determined using the access network information and the channel state information for the corresponding host node. One of the at least one host node is determined with consideration of the link state information for each of the at least one host node.

23 Claims, 8 Drawing Sheets

APPARATUS AND METHOD FOR ACTIVELY DETERMINING COMMUNICATION LINK IN COMMUNICATION SYSTEM

PRIORITY

This application claims the benefit under 35 U.S.C. §119(a) of a Korean patent application filed on Feb. 24, 2012 in the Korean Intellectual Property Office and assigned Serial No. 10-2012-0018909, the entire disclosure of which is hereby incorporated by reference.

BACKGROUND OF THE INVENTION

1. Field of the Invention

The present invention relates to an apparatus and a method for determining a communication link in a communication system. More particularly, the present invention relates to an apparatus and a method for actively determining a communication link in a communication system.

2. Description of the Related Art

As a wireless communication technology develops, use of various multimedia services using an electronic device increases. Accordingly, to provide various multimedia services depending on a user's demand, various communication technologies such as a wireless Local Area Network (LAN), tethering, and the like are being developed.

A wireless LAN is a communication scheme according to Institute of Electrical and Electronics Engineers (IEEE) 802.11 standard and denotes a communication technology used for a wireless network that supports data communication for a local area.

Tethering denotes a communication technology in which an electronic device connected to a network (e.g., a cellular network) operates as an Access Point (AP) of a wireless LAN to support data communication between other electronic devices and an external Internet.

As described above, in the case in which various data communication schemes are mixed, an electronic device may determine a link for data communication with consideration of a Received Signal Strength Indicator (RSSI) or a transmission rate with an AP. However, in the case of the wireless LAN, in contrast to a cellular network, an AP for the wireless LAN is often installed without consideration of cell planning thereby reducing the effectiveness of the network. Further, because the wireless LAN uses Industrial Scientific Medical (ISM) band, there is a greater potential for an influence of an interference inside/outside a cell of the wireless LAN.

Therefore, when an electronic device selects a link for data communication with consideration of only wireless channel information such as an RSSI or a transmission rate, the electronic device may have a difficulty in receiving a required transmission rate.

Therefore, a need exists for a system and method for apparatus and a method for actively determining a communication link in a communication system.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages described below. Accordingly, an aspect of the present invention is to provide an apparatus and a method for actively determining a communication link in a communication system.

Another aspect of the present invention is to provide an apparatus and a method for determining a communication link with consideration of access network information in a communication system.

Another aspect of the present invention is to provide an apparatus and a method for determining a communication link for data communication with consideration of access network information in a communication system.

Another aspect of the present invention is to provide an apparatus and a method for determining a communication link for data communication with consideration of link state information and access network information in a client node of a communication system.

In accordance with an aspect of the present invention, a method for determining a communication link in a client node of a communication system is provided. The method includes determining access network information and channel state information for at least one host node, determining link state information for each of the at least one host node using the access network information and the channel state information for the corresponding at least one host node, and selecting one of the at least one host node with consideration of the link state information for each of the at least one host node.

In accordance with another aspect of the present invention, an apparatus for determining a communication link in a client node of a communication system is provided. The apparatus includes a link connector for selecting at least one access host node among at least one host node with consideration of link state information of each of the at least one host node determined using access network information and channel state information for the at least one host node, and a communication system for performing communication with the at least one access host node determined by the link connector.

In accordance with further another aspect of the present invention, an electronic device is provided. The electronic device includes at least one processor, a storage, and at least one program stored in the storage and configured for being executable by the at least one processor, wherein the at least one program includes an instruction for determining link state information of each of at least one host node using access network information and channel state information for the at least one host node, and for selecting at least one access host node among the at least one host node with consideration of the link state information for each of the at least one host node.

Other aspects, advantages and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, like reference numerals will be understood to refer to like parts, components and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Hereinafter, an exemplary embodiment of the present invention describes a technology for determining a communication link in a client node of a communication system.

In the following description, a client node includes a portable electronic device, a mobile communication terminal, a Personal Digital Assistant (PDA), a laptop computer, a smart phone, a netbook, a television, a handheld computer, a Mobile Internet Device (MID), an Ultra Mobile PC (UMPC), a tablet Personal Computer (PC), a navigation, an MP3 player, and the like that receive a service via a host node.

In the following description, a host node includes an Access Point (AP), a host AP, a group owner providing a wireless LAN direct connection, a base station, and the like that access an access network to provide a service to a client node. The host node may be denoted by a portable electronic device, a mobile communication terminal, a PDA, a laptop computer, a smart phone, a netbook, a television, a handheld computer, an MID, a UMPC, a tablet PC, a navigation, an MP3 player, and the like.

Figure 1:
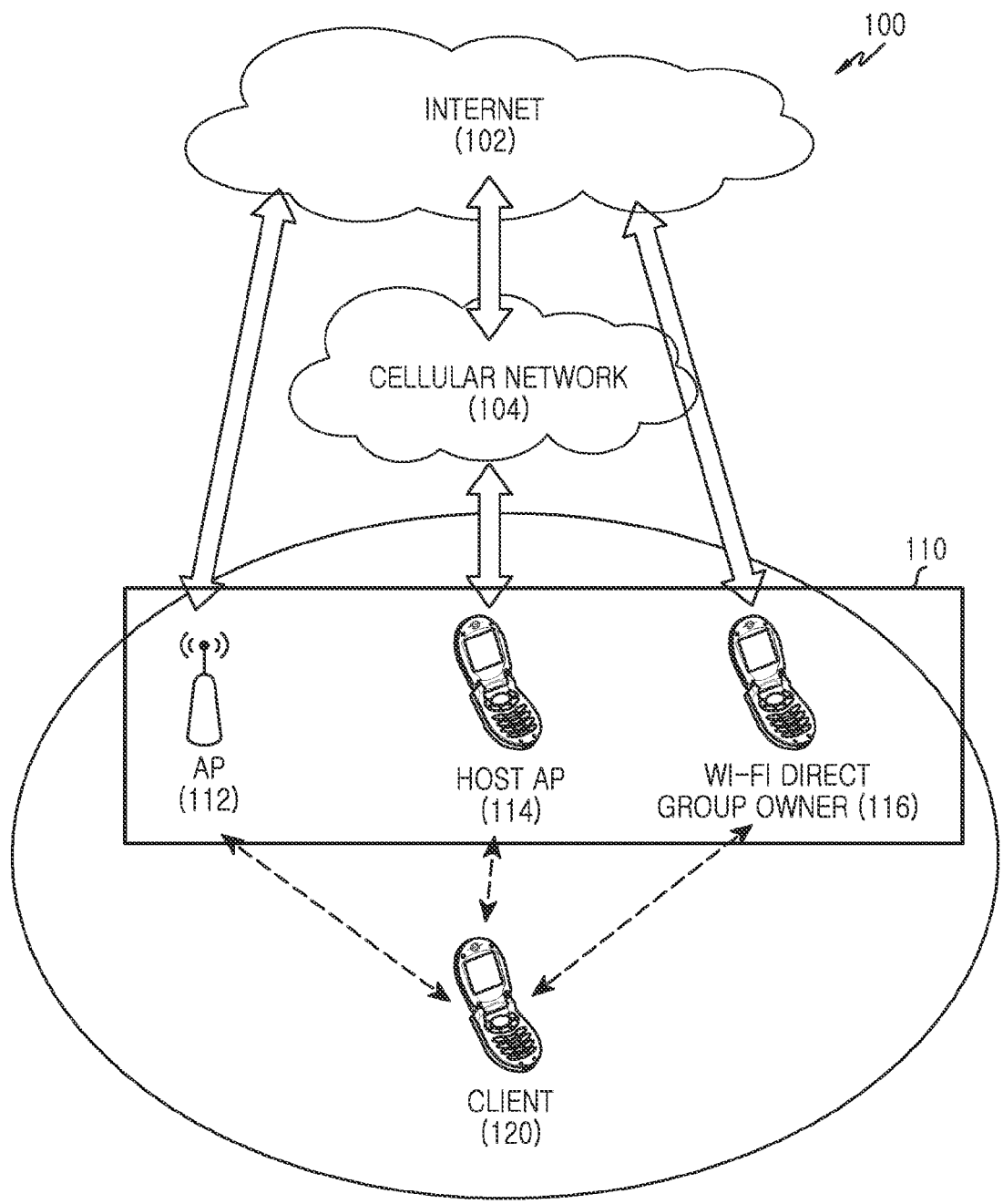
FIG. 1 is a view illustrating a construction of a communication system according to an exemplary embodiment of the present invention.

FIG. 1 illustrates a construction of a communication system according to an exemplary embodiment of the present invention.

Referring to FIG. 1, the communication system includes an access network 100, a host node 110, and a client node 120.

The access network 100 denotes a wireless network for providing a data communication service to the client node 120 that has accessed the access network 100 via the host node 110. For example, the access network 100 includes the Internet network 102 and a cellular network 104.

The host node 110 denotes a node for providing a data communication service to the client node 120 by connecting the client node 120 with the access network 100. For example, the host node 110 includes an AP 112 for providing a wireless LAN service to the client node 120 using the Internet network 102, a host AP 114 for providing a wireless LAN service to the client node 120 via tethering using the cellular network 104, and a group owner 116 for providing a wireless LAN direct connection. Here, the wireless LAN direct is a communication scheme by which client nodes provide a Peer to Peer (P2P) service via a wireless LAN and may also be called Wi-Fi direct.

The client node 120 accesses the access network 100 via the host node 110 to receive a service. At this point, the client node 120 selects a host node 110 via which it will access the access network 100 with consideration of access network information of respective host nodes 112, 114, and 116, and link state information depending on wireless state information. Here, the access network information includes information identifying a type of an access network 100 connected to the host node 110 and a data transmission rate between the host node 110 and the access network 100. The wireless state information includes a data transmission rate between the host node 110 and the client node 120. At this point, the wireless state information is also called channel state information.

Figure 2:
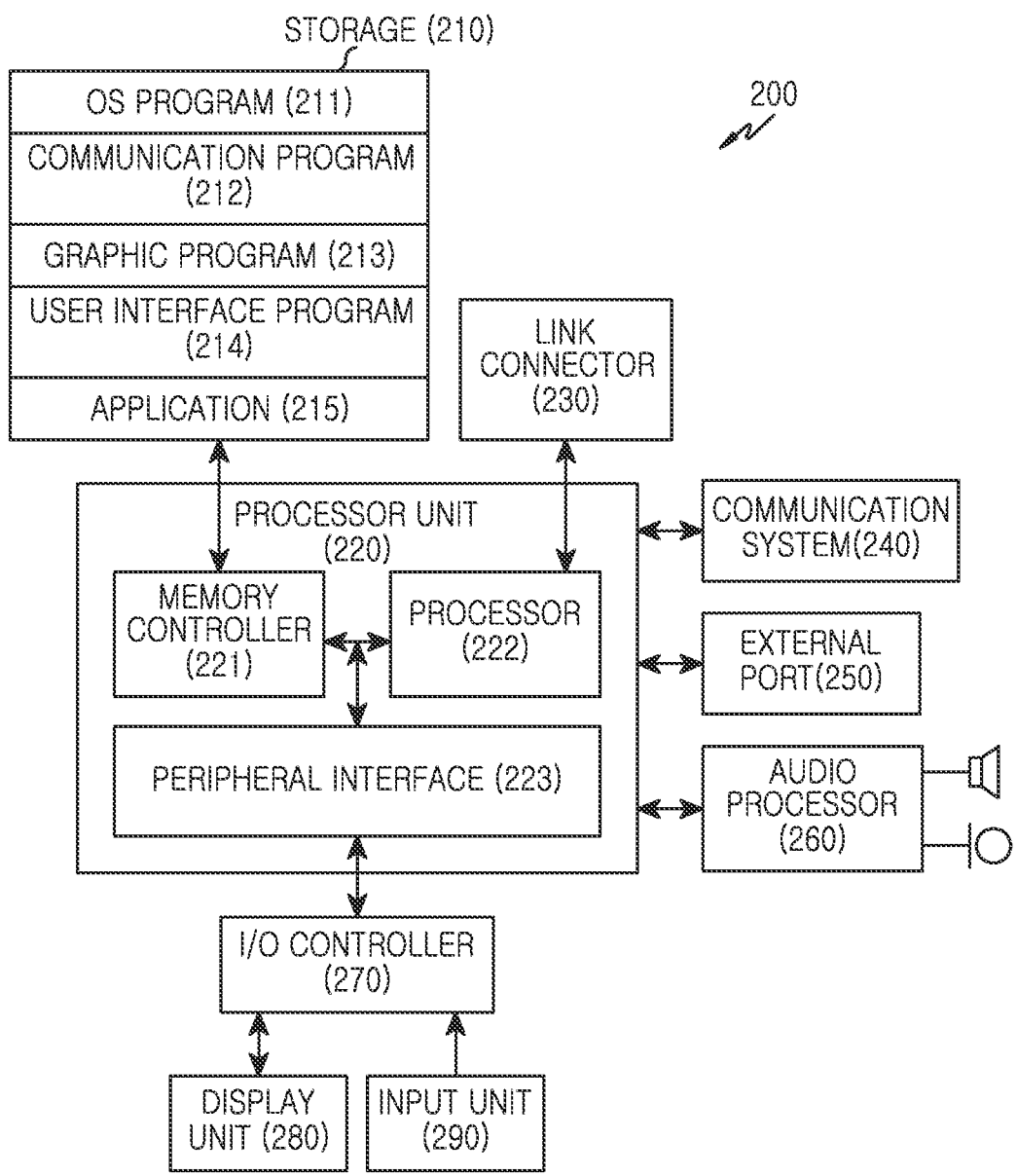
FIG. 2 is a block diagram illustrating a client node according to an exemplary embodiment of the present invention.

FIG. 2 is a block diagram illustrating a client node according to an exemplary embodiment of the present invention.

Referring to FIG. 2, the client node 200 includes a storage 210, a processor unit 220, a link connector 230, a communication system 240, an external port 250, an audio processor 260, an Input/Output (I/O) controller 270, a display unit 280, and an input unit 290. According to exemplary embodiments of the present invention, a plurality of storages 210, communication systems 240, and external ports 250 may be provided.

Each of the above-identified elements of the client node 200 is described below.

The storage 210 may include a program storage for storing a program for controlling an operation of the client node 200, and a data storage for storing data generated during execution of a program. For example, the program storage includes an operating system program 211, a communication program 212, a graphic program 213, a user interface program 214, and at least one application 215. According to exemplary embodiments of the present invention, a program included in the program storage may correspond to a set of instructions, and may be expressed as an instruction set.

The Operating System (OS) program 211 includes at least one software element for controlling a general system operation. Also, the operating system program 211 performs a function for smoothing communication between a plurality of hardware and software elements.

The communication program 212 includes at least one software element for processing data transmitted/received via the communication system 240 or the external port 250.

The graphic program 213 includes at least one software element for providing and displaying graphics on the display unit 280.

The user interface program 214 includes at least one software element related to a user interface.

The at least one application 215 includes a software element regarding the at least one application installed in the client node 200.

The processor unit 220 includes a memory controller 221, at least one processor 222, and a peripheral interface 223. The memory controller 221, the at least one processor 222, and the peripheral interface 223 included in the processor unit 220 may be integrated in at least one integrated circuit or implemented as separate elements.

The memory controller 221 controls an access of an element such as the processor 222 and the peripheral interface 223 to the storage 210.

The peripheral interface 223 controls connection between the input/output peripheral device of the client node 200, and the processor 222 and the storage 210.

The processor 222 controls the electronic device 200 to provide various services such as voice communication and data communication using at least one program. Also, the processor 222 executes at least one program stored in the storage 210 to control the electronic device 200 to provide a service corresponding to the relevant program. For example, the processor 222 may include at least one data processor, an image processor, and a CODEC.

The link connector 230 determines a communication link to access via the communication system 240. For example, as illustrated in FIGS. 5 to 8, the link connector 230 estimates link state information of each host node with consideration of access network information of each host node and wireless state information with each host node. Thereafter, the link connector 230 compares link state information of respective host nodes to select an access host node which will access the access network.

In the case in which a scan event occurs, the link connector 230 estimates link state information of each host node to determine an access host node. For example, in the case in which a scan period for determining an access host node arrives, the link connector 230 estimates link state information of each host node to determine the access host node. As another example, in the case in which channel state information with a currently accessed access host node becomes a reference value or less, the link connector 230 may estimate link state information of each host node to determine the access host node. As yet another example, in the case in which link state information of the currently accessed access host node becomes the reference value or less, the link connector 230 may estimate link state information of each host node to determine the access host node.

The communication system 240 performs a communication function with a host node for a communication link determined by the link connector 230. The communication system 240 may be divided into a plurality of communication subsystems supporting different communication networks. For example, though not limited thereto, the communication network may include a Global System for Mobile Communication (GSM) network, an Enhanced Data GSM Environment (EDGE) network, a Code Division Multiple Access (CDMA) network, a W-Code Division Multiple Access (W-CDMA) network, a Long Term Evolution (LTE) network, an Orthogonal Frequency Division Multiple Access (OFDMA) network, a wireless LAN, a Bluetooth network, and the like. The wireless LAN includes tethering and a wireless LAN direct scheme.

The external port 250 includes a connection interface for allowing the client node 200 to directly connect with a different device or to connect with a different device via a network. For example, the external port 250 may include a Universal Serial Bus (USB), FIREWIRE, and the like.

The audio processor 260 provides an audio interface between a user and the client node 200 using a speaker and a microphone.

The I/O controller 270 provides an interface between the peripheral interface 223 and an input/output unit such as the display unit 280, the input unit 290, and the like.

The display unit 280 displays state information of the client node 200, a letter input by the user, a moving picture, a still picture, and the like under control of the graphic program 213. In the case in which the display unit 280 is configured using a touchscreen, the display unit 280 may provide touch information of the touchscreen to the processor unit 220 via the I/O controller 270.

The input unit 290 provides input data generated by the user's selection to the processor unit 220 via the I/O controller 270. For example, the input unit 290 includes only a control button for controlling the client node 200. As another example, the input unit 290 may be configured using a keypad for receiving input data from the user.

Hereinafter, a block construction of the link connector 230 for determining a communication link is described in detail.

Figure 3:
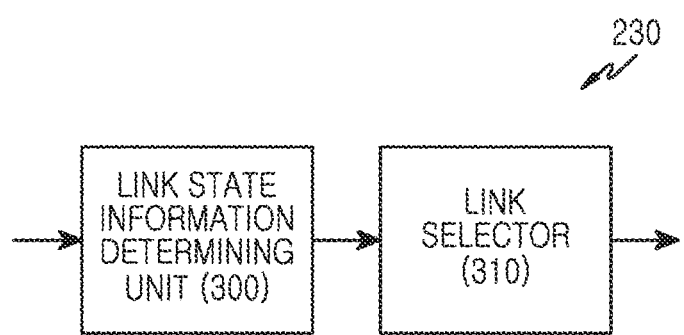
FIG. 3 is a block diagram illustrating a link connector according to an exemplary embodiment of the present invention.

FIG. 3 is a block diagram illustrating a link connector according to an exemplary embodiment of the present invention.

Referring to FIG. 3, the link connector 230 includes a link state information determining unit 300 and a link selector 310.

The link state information determining unit 300 determines access network information of each host node and wireless state information with each host node via a control signal provided from at least one host node. For example, the link state information determining unit 300 may determine wireless state information between a host node and the client node from a header of a control signal provided from the host node. Also, the link state information determining unit 300 determines access network information of a host node included in a data region of a control signal. As another example, the link state information determining unit 300 may determine wireless state information between a host node and the client node and access network information of the host node from a header of a control signal provided from the host node. As yet another example, the link state information determining unit 300 may determine wireless state information between the host node and the client node from a header of a first control signal provided from the host node, and determine access network information of the host node from a header of a second control signal. As another example, the link state information determining unit 300 may determine wireless state information between the host node and the client node from a header of a first control signal provided from the host node, and determine access network information of the host node included in a data region of a second control signal. The control signal includes a probe response signal and a beacon signal.

Thereafter, the link state information determining unit 300 estimates link state information of each host node with consideration of access network information of each host node and wireless state information with each host node. At this point, the link state information determining unit 300 may apply different weights to the access network information and the wireless state information to estimate link state information of each host. According to exemplary embodiments of the present invention, weights applied to the access network information and the wireless state information may be determined with consideration of network state information of each host node. The network state information includes bottle neck phenomenon information of an access network.

The link selector 310 compares link state information of respective host nodes estimated by the link state information determining unit 300 to select an access host node. At this point, the link selector 310 selects the access host node via an access host node selection algorithm depending on a service kind of the client node 200. For example, the link selector 310 selects a host node whose link state information is best as an access host node.

According to the above exemplary embodiment of the present invention, the link connector 230 determines access network information of a host node and wireless state information with the host node from a control signal provided from the host node.

Figure 4:
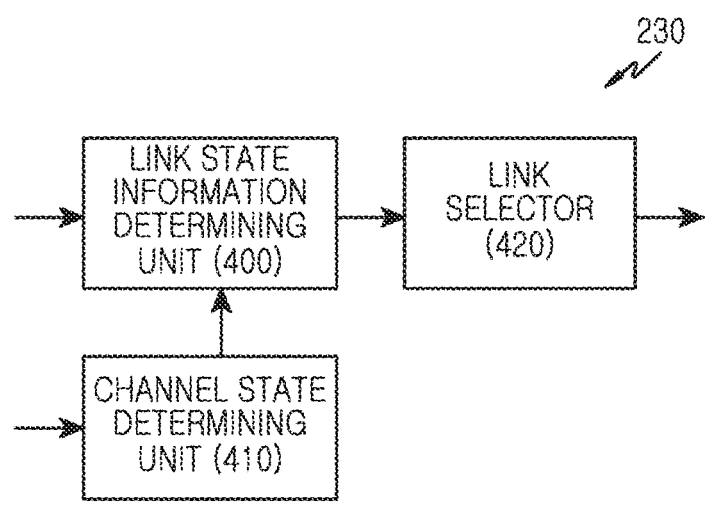
FIG. 4 is a block diagram illustrating a link connector according to another exemplary embodiment of the present invention.

According to exemplary embodiment of the present invention, the link connector 230 may estimate wireless state information with the host node as illustrated in FIG. 4.

FIG. 4 is a block diagram illustrating a link connector according to another exemplary embodiment of the present invention.

Referring to FIG. 4, the link connector 230 includes a channel state determining unit 400, a link state information determining unit 410, and a link selector 420.

The channel state determining unit 400 estimates a wireless channel state with a host node using a control signal provided from the host node.

The link state information determining unit 410 determines access network information of each host node via a control signal provided from at least one host node. For example, the link state information determining unit 410 determines access network information of a host node included in a data region of a control signal provided from the host node. For another example, the link state information determining unit 410 may determine the access network information of the host node from a header of a control signal provided from the host node. The control signal includes a probe response signal and a beacon signal.

After that, the link state information determining unit 410 estimates link state information of each host node with consideration of access network information of each host node and wireless state information with the host node estimated by the channel estimator 400. At this point, the link state information determining unit 410 may apply different weights to the access network information and the wireless state information, respectively, to estimate link state information of each host. The weights applied to the access network information and the wireless state information may be determined with consideration of network state information of each host node. The network state information includes bottle neck phenomenon information of an access network.

The link selector 420 compares link state information of respective host nodes estimated by the link state information determining unit 410 to select an access host node. At this point, the link selector 420 selects the access host node via an access host node selection algorithm depending on a service kind of the client node 200. For example, the link selector 420 selects a host node whose link state information is best as an access host node.

According to the above exemplary embodiment of the present invention, the client node includes the link connector 230 for determining a communication link to access via the communication system 240. According to an exemplary embodiment of the present invention, the client node may include the link connector 230 in the form of a program stored in the storage 110.

Figure 5:
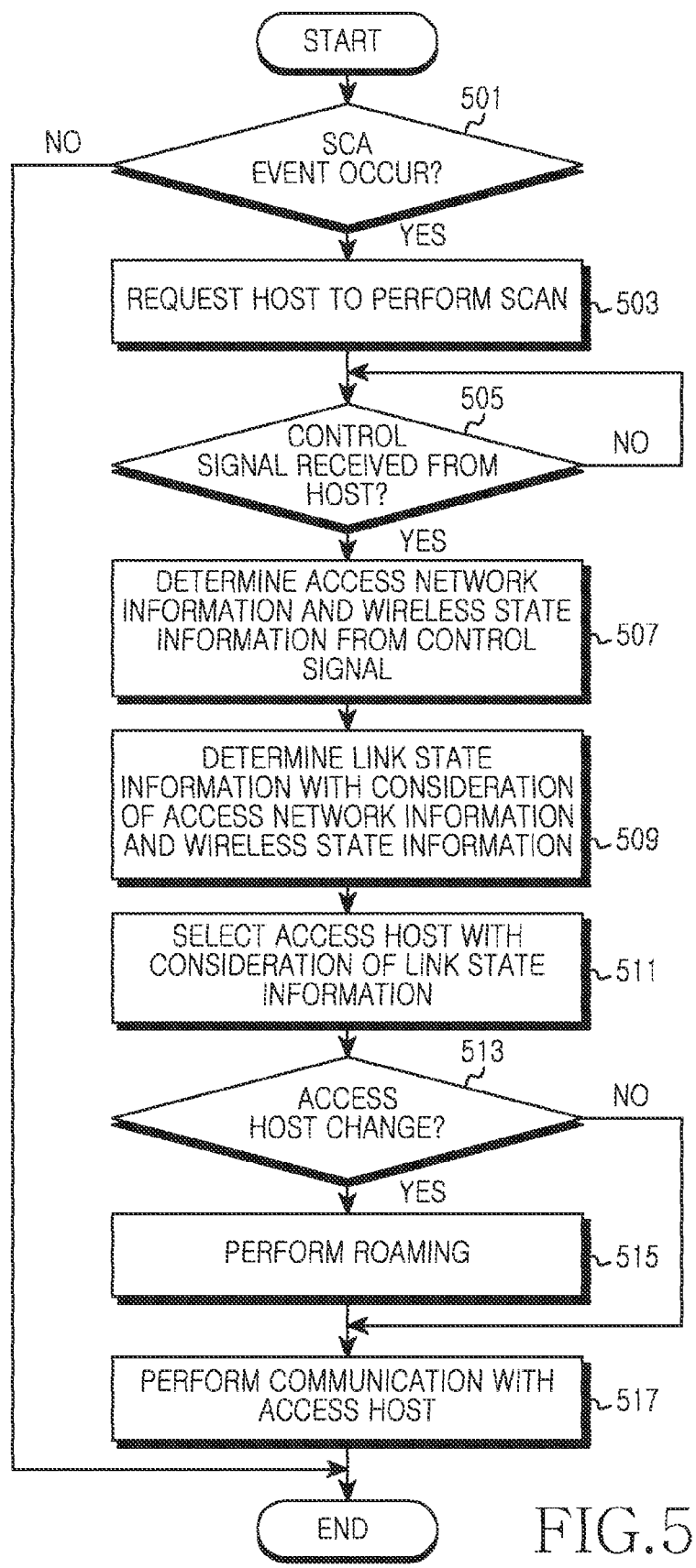
FIG. 5 is a flowchart illustrating a procedure for determining, at a client node, a link according to an exemplary embodiment of the present invention.

FIG. 5 illustrates a procedure for determining, at a client node, a link according to an exemplary embodiment of the present invention.

Referring to FIG. 5, the client node determines whether a scan event for determining an access host node occurs in step 501. For example, the client node determines whether a scan period for determining an access host node arrives. As another example, the client node may determine whether the scan event occurs with consideration of channel state information with a currently accessed access host node. As yet another example, the client node may determine whether the scan event occurs with consideration of link state information of the currently accessed access host node.

When the client node determines that the scan event does not occur, the client node ends the present algorithm.

In contrast, when the client node determines that the scan event occurs, the client node proceeds to step 503 in which the client node requests a host node located in the neighborhood to perform scan. For example, the client node broadcasts a scan request message.

Thereafter, the client node proceeds to step 505 in which the client node determines whether a response message to a scan request is received from at least one host node.

If the client node determines that a response message to a scan request is not received from at least one host node, the client node continues to poll for the response message at step 505.

If a response message to a scan request is received from at least one host node, the client node proceeds to step 507 in which the client node determines access network information of the host node and wireless state information with the host node from a response signal provided from the host node. For example, the client node determines wireless state information between the host node and the client node from a header of the control signal provided from the host node, and determines access network information of the host node included in a data region of the control signal. As another example, the client node may determine wireless state information between a host node and the client node and access network information of the host node from a header of a control signal provided from the host node. As another example, the client node may determine wireless state information between a host node and the client node from a header of a first control signal provided from the host node, and determine access network information of the host node from a header of a second control signal. As yet another example, the client node may determine wireless state information between a host node and the client node from a header of a first control signal provided from the host node, and determine access network information of the host node included in a data region of a second control signal. The control signal includes a probe response signal and a beacon signal. The access network information includes a kind of an access network to which the host node is connected, and a data transmission rate between the host node and the access network. The wireless state information includes a data transmission rate between the host node and the client node.

Thereafter, the client node proceeds to step 509 in which the client node estimates link state information of each host node with consideration of access network information of each host node and wireless state information with each host node. At this point, the client node may apply different weights to the access network information and the wireless state information.

After estimating the link state information of each host node, the client node selects an access host node with consideration of the link state information of each host node in step 511. At this point, the client node may select an access host node using different access host node selection algorithms depending on a kind of a service used by the client node. Weights applied to the access network information and the wireless state information may be determined with consideration of network state information of each host node.

The client node proceeds to step 513 in which the client node determines whether an access host node changes. For example, the client node determines whether a host node accessed before a scan event occurs and a host node selected in step 511 are the same.

When the access host node does not change, the client node proceeds to step 517 in which the client node transmits/receives data via the access host node.

In contrast, when the access host node changes, the client node proceeds to step 515 in which the client node performs roaming for changing a communication link to the access host node selected in step 511. At this point, the client node supports a pre association operation for seamless data communication.

After performing the roaming for changing the communication link, the client node proceeds to step 517 in which the client node transmits/receives data via the access host node.

After that, the client node ends the present algorithm.

According to the above exemplary embodiment of the present invention, it has been assumed that roaming of the client node, for changing a communication link has been successful. In the case in which the roaming for changing the communication link has failed, the client node determines whether a different access host node exists. For example, in the case in which the roaming for changing the communication link has failed, the client node proceeds to step 501 in which the client node determines whether a scan event occurs. As another example, in the case in which the roaming for changing the communication link has failed, the client node proceeds to step 503 in which the client node requests a host node to perform scan. As yet another example, in the case in which the roaming for changing the communication link has failed, the client node proceeds to step 511 in which the client node selects a different access host node.

According to the above exemplary embodiment of the present invention, the client node receives wireless state information with a host node from the host node.

Figure 6:
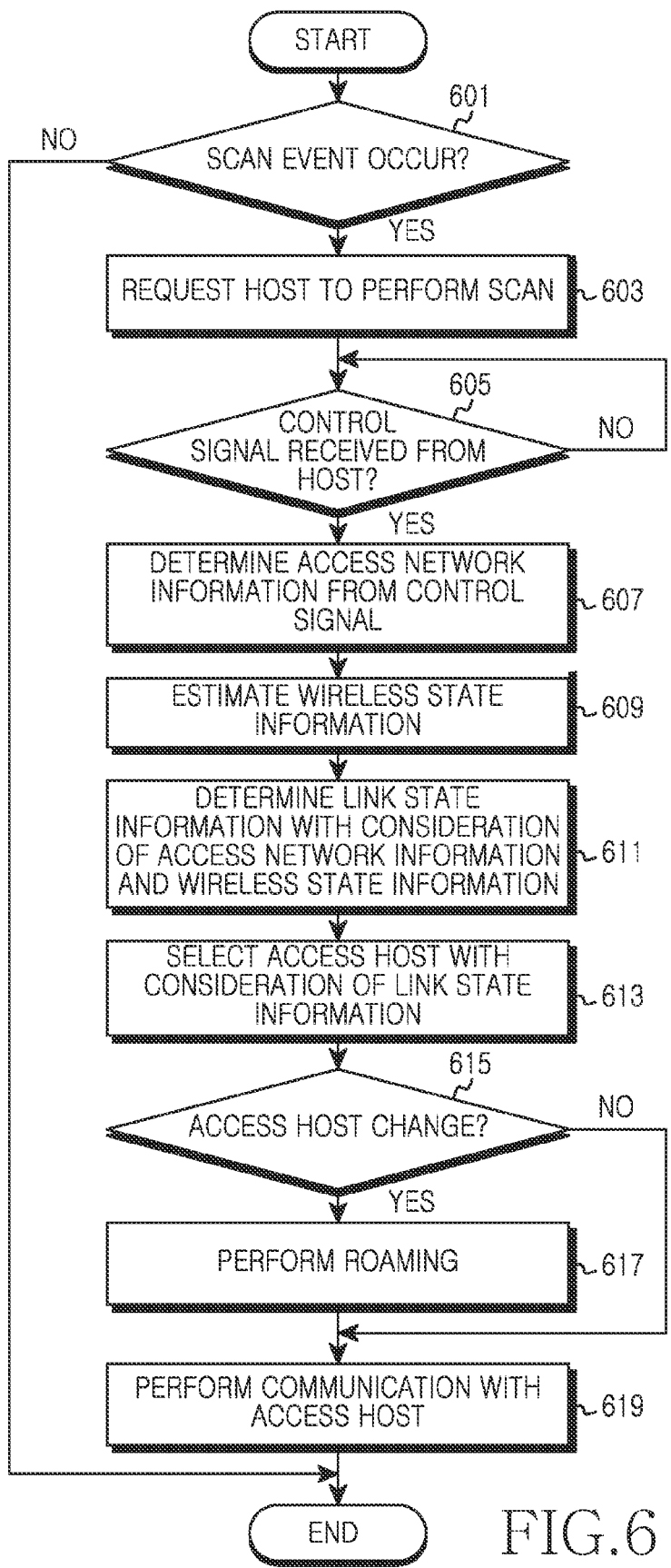
FIG. 6 is a flowchart illustrating a procedure for determining, at a client node, a link according to an exemplary embodiment of the present invention.

According to an exemplary embodiment of the present invention, the client node may estimate wireless state information with a host node as illustrated in FIG. 6.

FIG. 6 illustrates a procedure for determining, at a client node, a link according to an exemplary embodiment of the present invention.

Referring to FIG. 6, the client node determines whether a scan event for determining an access host node occurs in step 601. For example, the client node determines whether a scan period for determining an access host node arrives. As another example, the client node may determine whether a scan event occurs with consideration of channel state information with a currently accessed access host node. As yet another example, the client node may determine whether a scan event occurs with consideration of link state information of a currently accessed access host node.

In the case in which the client node determines that a scan event does not occur, the client node ends the present algorithm.

In contrast, in the case in which the client node determines that a scan event occurs, the client node proceeds to step 603 in which the client node requests a host node located in the neighborhood to perform scan. For example, the client node broadcasts a scan request message.

Thereafter, the client node proceeds to step 605 in which the client node determines whether a response signal to a scan request is received from at least the host node.

If the client node determines that a response signal to a scan request is not received from at least the host node in step 605, then the client node continues to poll for the response signal to the scan request in step 605.

In the case in which the client node determines that a response signal to a scan request is received from at least one host node in step 605, the client node proceeds to step 607 in which the client node determines access network information of a host node from the response signal provided from the host node. For example, the client node determines access network information of a host node included in a data region of a control signal provided from the host node. As another example, the client node may determine access network information of a host node from a header of a control signal provided from the host node.

Thereafter, the client node proceeds to step 609 in which the client node estimates wireless state information with each host node using a control signal provided from each host node that has received a control signal.

After determining access network information of each host node and wireless state information with each host node in step 609, the client node proceeds to step 611 in which the client node estimates link state information of each host node with consideration of the access network information of each host node and the wireless state information of each host node. At this point, the client node may apply different weights to the access network information and the wireless state information.

After estimating the link state information of each host node in step 611, the client node proceeds to step 613 in which the client node selects an access host node with consideration of the link state information of each host node. At this point, the client node may select the access host node using different access host node selection algorithms depending on a kind of a service used by the client node.

Thereafter, the client node proceeds to step 615 in which the client node determines whether the access host node changes. For example, the client node determines whether a host node accessed before a scan event occurs and a host node selected in step 613 are the same.

When the client node determines that the access host node does not change in step 615, the client node proceeds to step 619 in which the client node transmits/receives data via the access host node.

In contrast, when the client node determines that the access host node changes in step 615, the client node proceeds to step 617 in which the client node perform roaming for changing a communication link to the access host node selected in step 613. At this point, the client node supports a pre association operation for seamless data communication.

After performing the roaming for changing the communication link in step 617, the client node proceeds to step 619 in which the client node transmits/receives data via the access host node.

Thereafter, the client node ends the present algorithm.

According to the above exemplary embodiment of the present invention, it has been assumed that roaming of the client node, for changing a communication link has been successful. In the case in which the roaming for changing the communication link has failed, the client node determines whether a different access host node exists. For example, in the case in which the roaming for changing the communication link has failed, the client node proceeds to step 601 in which the client node determines whether a scan event occurs. As another example, in the case in which the roaming for changing the communication link has failed, the client node proceeds to step 603 in which the client node requests a host node to perform scan. As yet another example, in the case in which the roaming for changing the communication link has failed, the client node proceeds to step 613 in which the client node selects a different access host node.

According to the above exemplary embodiment of the present invention, the client node requests the host node to perform scan and receives a control signal including access network information of each host node.

Figure 7:
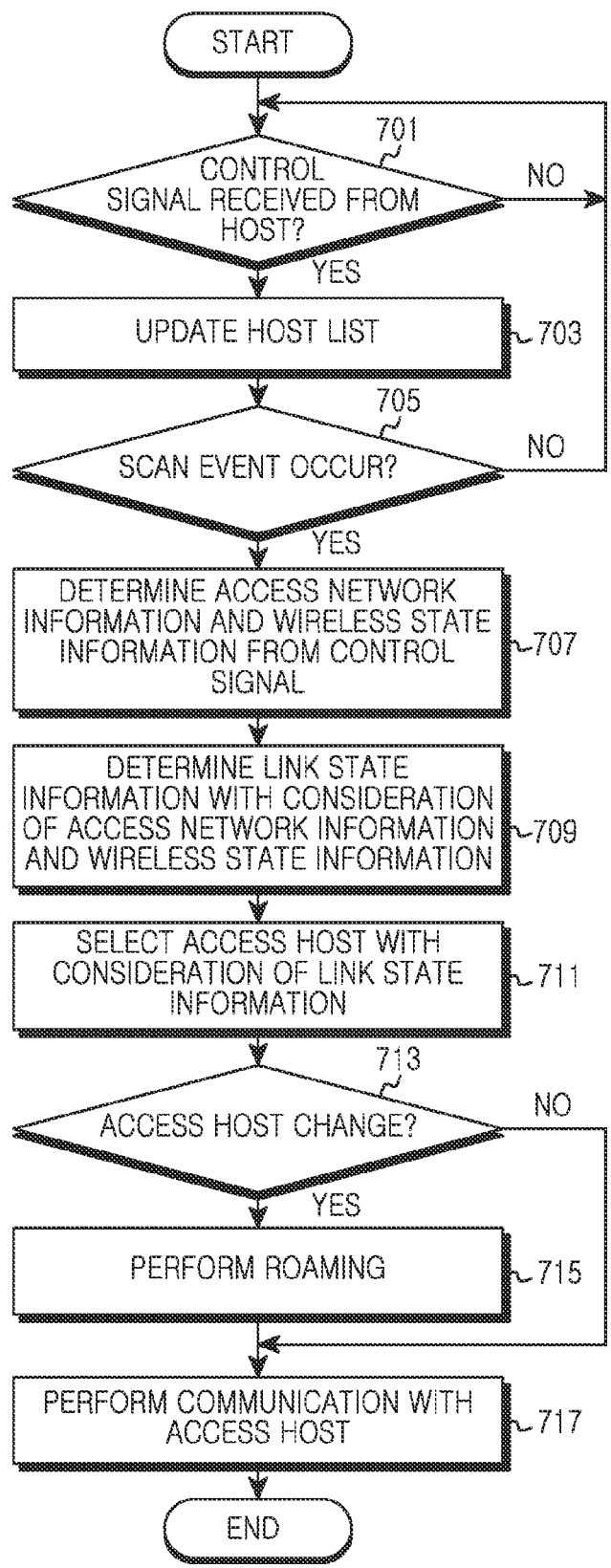
FIG. 7 is a flowchart illustrating a procedure for determining, at a client node, a link according to an exemplary embodiment of the present invention.

According to an exemplary embodiment of the present invention, the client node may determine access network information from a control signal provided from a host node without a scan request as illustrated in FIG. 7.

FIG. 7 is a flowchart illustrating a procedure for determining, at a client node, a link according to an exemplary embodiment of the present invention.

Referring to FIG. 7, the client node determines whether a control signal of a host node located in the neighborhood is received in step 701. The control signal of the host node includes a probe response signal and a beacon signal.

If the client node determines that a control signal of the host node is not received in step 701, the client node continues to poll for the control signal.

In the case in which the client node determines that a control signal of the host node is received, the client node proceeds to step 703 in which the client node updates a host list including information regarding a neighbor host node according to the control signal of the host node. For example, in a case in which a control signal is received from a first host node not included in a host list, the client node adds the first host node to the host list. In contrast, in a case a control signal is not received from a second host node included in the host list for a predetermined time, the client node may delete the second host node from the host list.

Thereafter, the client node proceeds to step 705 in which the client node determines whether a scan event for determining an access host node occurs. For example, the client node determines whether a scan period for determining an access host node arrives. As another example, the client node may determine whether a scan event occurs with consideration of channel state information with a currently accessed access host node. As yet another example, the client node may determine whether a scan event occurs with consideration of link state information of a currently accessed access host node.

In the case in which the client node determines that a scan event does not occur in step 705, the client node proceeds to step 701 in which the client node determines whether a control signal of a host node is received.

In contrast, in the case in which the client node determines that a scan event occurs in step 705, the client node proceeds to step 707 to determine access network information of a host node and wireless state information with the host node from a control signal of the host node. For example, the client node determines wireless state information between a host node and the client node from a header of a control signal provided from the host node, and determines access network information of the host node included in a data region of the control signal. As another example, the client node may determine wireless state information between a host node and the client node and access network information of the host node from a header of a control signal provided from the host node. As yet another example, the client node may determine wireless state information between a host node and the client node from a header of a first control signal provided from the host node, and determine access network information of the host node from a header of a second control signal. As another example, the client node may determine wireless state information between a host node and the client node from a header of a first control signal provided from the host node, and determine access network information of the host node included in a data region of a second control signal.

Thereafter, the client node proceeds to step 709 in which the client node estimates link state information of each host node with consideration of access network information of each host node and wireless state information with each host node. At this point, the client node may apply different weights to the access network information and the wireless state information, respectively.

After estimating the link state information of each host node in step 709, the client node proceeds to step 711 in which the client node selects an access host node with consideration of the link state information of each host node. At this point, the client node may select the access host node using different access host node selection algorithms depending on a kind of a service used by the client node. The weights applied to the access network information and the wireless state information may be determined with consideration of network state information of each host node.

Thereafter, the client node proceeds to step 713 in which the client node determines whether an access host node changes. For example, the client node determines whether a host node accessed before a scan event occurs and a host node selected in step 711 are the same.

When the client node determines that the access host node does not change in step 713, the client node proceeds to step 717 in which the client node transmits/receives data via the access host node.

In contrast, when the client node determines that the access host node changes in step 713, the client node proceeds to step 715 in which the client node performs roaming for changing a communication link to the access host node selected in step 711. At this point, the client node supports a pre association operation for seamless data communication.

After performing the roaming for changing the communication link in step 715, the client node proceeds to step 717 in which the client node transmits/receives data via the access host node.

Thereafter, the client node ends the present algorithm.

According to the above exemplary embodiment of the present invention, it has been assumed that roaming of the client node, for changing a communication link has been successful. In the case in which the roaming for changing the communication link has failed, the client node determines whether a different access host node exists. For example, in the case in which the roaming for changing the communication link has failed, the client node proceeds to step 701 in which the client node determines whether a control signal of a host node is received. As another example, in the case in which the roaming for changing the communication link has failed, the client node may proceed to step 705 in which the client node determines whether a scan event occurs. As yet another example, in the case in which the roaming for changing the communication link has failed, the client node may proceed to step 711 in which the client node selects a different access host node.

According to the above exemplary embodiment of the present invention, the client node receives wireless state information with a host node from the host node.

Figure 8:
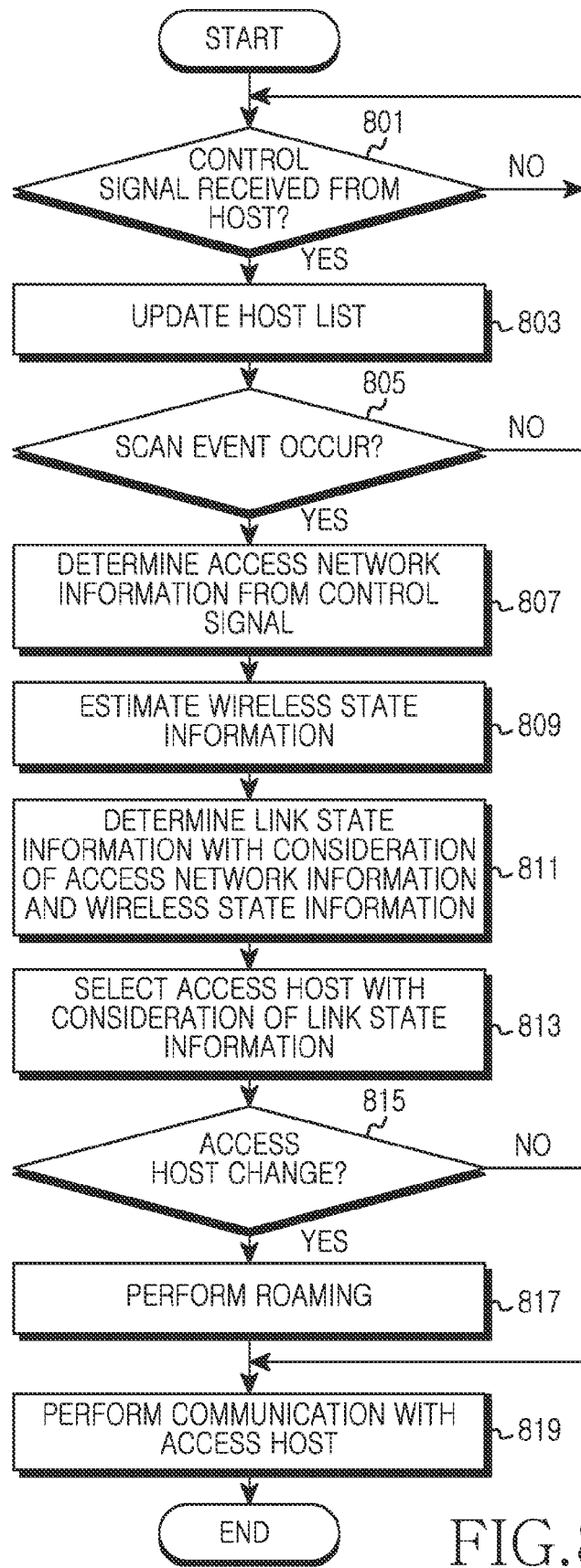
FIG. 8 is a flowchart illustrating a procedure for determining, at a client node, a link according to an exemplary embodiment of the present invention.

According to an exemplary embodiment of the present invention, the client node may estimate wireless state information with a host node as illustrated in FIG. 8.

FIG. 8 illustrates a procedure for determining, at a client node, a link according to an exemplary embodiment of the present invention.

Referring to FIG. 8, the client node determines whether a control signal of a host node located in the neighborhood is received in step 801. The control signal includes a probe response signal and a beacon signal.

If the client node determines that a control signal has not been received in step 801, then the client node continues to poll for a control signal from the host node in step 801.

In the case in which the client node determines that a control signal of the host node is received, the client node proceeds to step 803 in which the client node updates a host list including information regarding a neighbor host node according to the control signal of the host node. For example, in a case in which a control signal is received from a first host node not included in a host list, the client node adds the first host node to the host list. In contrast, in case in which a control signal is not received from a second host node included in the host list for a predetermined time, the client node may delete the second host node from the host list.

After that, the client node determines whether a scan event for determining an access host node occurs in step 805. For example, the client node determines whether a scan period for determining an access host node arrives. As another example, the client node may determine whether a scan event occurs with consideration of channel state information with a currently accessed access host node.

In the case in which the client node determines that a scan event does not occur in step 805, the client node proceeds to step 801 in which the client node determines whether a control signal of a host node is received.

In contrast, in the case in which the client node determines that a scan event occurs in step 805, the client node proceeds to step 807 in which the client node determines access network information of the host node from a control signal of the host node. For example, the client node determines access network information of a host node included in a data region of a control signal provided from the host node. As another example, the client node may determine access network information of a host node from a header of a control signal provided from the host node. As another example, the client node may determine whether a scan event occurs with consideration of link state information of a currently accessed access host node.

Thereafter, the client node proceeds to step 809 in which the client node estimates wireless state information with each host node using a control signal provided from each host node that has received a control signal.

After determining access network information of each host node and wireless state information with each host node, the client node proceeds to step 811 in which the client node estimates link state information of each host node with consideration of the access network information of each host node and the wireless state information of each host node. At this point, the client node may apply different weights to the access network information and the wireless state information, respectively.

After estimating the link state information of each host node, the client node proceeds to step 813 in which the client node selects an access host node with consideration of the link state information of each host node. At this point, the client node may select an access host node using different access host node selection algorithms depending on a kind of a service used by the client node.

Thereafter, the client node proceeds to step 815 in which determine whether an access host node changes. For example, the client node determines whether a host node accessed before a scan event occurs and a host node selected in step 813 are the same.

In the case in which the client node determines that the access host node does not change in step 815, the client node proceeds to step 819 in which the client node transmits/receives data via the access host node.

In contrast, when the client node determines that the access host node changes in step 815, the client node proceeds to step 817 in which the client node performs roaming for changing a communication link to the access host node selected in step 813. At this point, the client node supports a pre association operation for seamless data communication.

After performing the roaming for changing the communication link, the client node proceeds to step 819 in which the client node transmits/receives data via the access host node.

Thereafter, the client node ends the present algorithm.

According to the above exemplary embodiment of the present invention, it has been assumed that roaming of the client node, for changing a communication link has been successful. In the case in which the roaming for changing the communication link has failed, the client node determines whether a different access host node exists. For example, in the case in which the roaming for changing the communication link has failed, the client node proceeds to step 801 in which the client node determines whether a control signal of a host node is received. As another example, in the case in which the roaming for changing the communication link has failed, the client node proceeds to step 805 in which the client node determines whether a scan event occurs. As yet another example, in the case in which the roaming for changing the communication link has failed, the client node may proceed to step 813 in which the client node selects a different access host node.

As described above, the client node selects an access host node with consideration of link state information of each host node. At this point, the client node may select one of host nodes of different communication schemes as the access host node. The client node may select a communication scheme for data communication with consideration of link state information of host nodes of different communication schemes. For example, the client node selects one of host nodes as the access host node with consideration of link state information of the AP 112, the host AP 114, and the Wi-Fi direct group owner 116 illustrated in FIG. 1.

Meanwhile, the client node may select one of host nodes of the same communication schemes. For example, the client node selects one of a plurality of APs as the access host node.

Also, the client node may select the access host node for a communication link under a state where host nodes of the same communication scheme and host nodes of different communication schemes are mixed.

According to the above exemplary embodiment of the present invention, it is assumed that the host node and the client node perform communication via a radio resource.

According to an exemplary embodiment of the present invention, in the case in which the host node and the client node perform communication via a wired resource, the client node may determine one access host node with consideration of link state information of host nodes as described above.

According to an exemplary embodiment of the present invention, the client node may determine one access host node with consideration of link state information of at least one host node performing communication using a wired resource and at least one host node performing communication using a radio resource.

As described above, because the client node of a communication system determines a communication link for data communication with consideration of link state information and access network information, an optimized link state is maintained and Quality of Service (QoS) for data transmission/reception may be improved.

Also, because the client node of the communication system actively determines a communication link for data communication, a load of a host node is dispersed and the host node may swiftly perform data communication.

Program instructions to perform a method described herein, or one or more operations thereof, may be recorded, stored, or fixed in one or more non-transitory computer-readable storage media. The program instructions may be implemented by a computer. For example, the computer may cause a processor to execute the program instructions. The media may include, alone or in combination with the program instructions, data files, data structures, and the like. Examples of computer-readable media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The program instructions, that is, software, may be distributed over network coupled computer systems so that the software is stored and executed in a distributed fashion. For example, the software and data may be stored by one or more computer readable recording mediums. Also, functional programs, codes, and code segments for accomplishing the example embodiments disclosed herein can be easily construed by programmers skilled in the art to which the embodiments pertain based on and using the flow diagrams and block diagrams of the figures and their corresponding descriptions as provided herein. Also, the described unit to perform an operation or a method may be hardware, software, or some combination of hardware and software. For example, the unit may be a software package running on a computer or the computer on which that software is running.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for determining a communication link in a client node of a communication system, the method comprising:
   determining access network information and channel state information for at least one host node;
   determining link state information for each of the at least one host node using the access network information and the channel state information for the corresponding at least one host node; and
   selecting one of the at least one host node with consideration of the link state information for each of the at least one host node.

2. The method of claim 1, wherein the access network information comprises at least one of a type of an access network connected to the at least one host node and a data transmission rate between the at least one host node and the access network.

3. The method of claim 1, wherein the channel state information denotes channel information between the client node and the at least one host node, and
   wherein the channel information comprises a data transmission rate.

4. The method of claim 1, wherein the determining of the access network information and the channel state information comprises:
   determining the access network information and the channel state information for the at least one host node from a control signal provided from each of the at least one host node.

5. The method of claim 1, wherein the determining of the access network information and the channel state information comprises:
   determining the access network information for the at least one host node from a control signal provided from each of the at least one host node; and
   estimating the channel state information with each of the at least one host node using a control signal provided from each of the at least one host node.

6. The method of claim 1, wherein the determining of the link state information comprises:
   determining a weight to apply to the access network information and the channel state information for the at least one host node; and
   applying the weight to the access network information and the channel state information for the at least one host node to determine the link state information for each of the at least one host node.

7. The method of claim 6, wherein the weight is determined with consideration of a bottle neck phenomenon of each of the at least one host node.

8. The method of claim 1, further comprising, after determining the access host node, at least one of transmitting and receiving data via the access host node.

9. The method of claim 1, further comprising:
   determining whether a scan event occurs,
   wherein when the scan event is determined to have occurred, the access network information and the channel state information for the at least one host node are determined.

10. The method of claim 9, wherein the determining whether the scan event occurs comprises:
    determining whether the scan event occurs with consideration of one of a scan period, channel state information with the client node and the at least one host node, and the link state information of the at least one host node.

11. An apparatus of a client node of a communication system, the apparatus comprising:
    a link connector for selecting at least one access host node among at least one host node with consideration of link state information of each of the at least one host node determined using access network information and channel state information for the at least one host node; and
    a communication system for performing communication with the at least one access host node determined by the link connector.

12. The apparatus of claim 11, wherein the access network information comprises at least one of a type of an access network connected to one of the at least one host node and a data transmission rate between the one of the at least one host node and the access network.

13. The apparatus of claim 11, wherein the channel state information denotes channel information between the client node and the at least one host node, and the channel information comprises a data transmission rate.

14. The apparatus of claim 11, wherein the link connector determines the access network information and the channel state information for the at least one host node from a control signal provided from each of the at least one host node.

15. The apparatus of claim 11, wherein the link connector determines the access network information for the host node from a control signal provided from each of the at least one host node, and estimates the channel state information with each of the at least one host node using a control signal provided from each of the at least one host node.

16. The apparatus of claim 11, wherein the link connector applies weights to the access network information and the channel state information for the at least one host node, respectively, to determine the link state information for each of the at least one host node.

17. The apparatus of claim 16, wherein the weight is determined with consideration of a bottle neck phenomenon of each of the at least one host node.

18. The apparatus of claim 11, wherein the link connector comprises:
- a link state information determining unit for determining link state information for each of the at least one host node using the access network information and the channel state information for the at least one host node; and
- a link selector for selecting at least one access host node among at least one host node with consideration of the link state information of each of the at least one host node.

19. The apparatus of claim 11, wherein when a scan event occurs, the link connector selecting at least one access host node among at least one host node with consideration of the link state information for each of the at least one host node determined using the access network information and the channel state information for the at least one host node.

20. The apparatus of claim 19, wherein the link connector determines whether the scan event occurs with consideration of one of a scan period, channel state information with the client node and the host node, and the link state information of the host node.

21. An electronic device comprising:
- at least one processor;
- a storage module; and
- at least one program stored in the storage module and configured for being executable by the at least one processor,
- wherein the at least one program comprises an instruction for determining link state information of each of at least one host node using access network information and channel state information for the at least one host node, and for selecting at least one access host node among the at least one host node with consideration of the link state information for each of the at least one host node.

22. The electronic device of claim 21, wherein the access network information comprises at least one of a type of an access network connected to the at least one host node and a data transmission rate between the at least one host node and the access network.

23. The electronic device of claim 21, wherein the channel state information denotes channel information between the client node and the at least one host node, and the channel information comprises a data transmission rate.

* * * * *